(12) United States Patent
Tirapu Azpiroz et al.

(10) Patent No.: US 11,790,070 B2
(45) Date of Patent: Oct. 17, 2023

(54) MULTI-FACTOR AUTHENTICATION AND SECURITY

(71) Applicant: International Business Machines Corporation, Armonk, NY (US)

(72) Inventors: Jaione Tirapu Azpiroz, Rio de Janeiro (BR); Christian Srebrenov Rashev, Brno - Stránice (CZ); William Bruce Nicol, II, Durham, NC (US); Emily Supil, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 17/230,122

(22) Filed: Apr. 14, 2021

(65) Prior Publication Data

US 2022/0335113 A1 Oct. 20, 2022

(51) Int. Cl.
*G06F 21/34* (2013.01)
*G06F 21/40* (2013.01)
*G07C 9/32* (2020.01)

(52) U.S. Cl.
CPC .............. *G06F 21/34* (2013.01); *G06F 21/40* (2013.01); *G07C 9/32* (2020.01)

(58) Field of Classification Search
CPC .. G06F 21/32; G06F 18/00; G06F 2203/0338; G06F 3/04883; G06F 2203/04105; G06F 21/31; G06Q 20/341; H04W 12/06
See application file for complete search history.

(56) References Cited

U.S. PATENT DOCUMENTS

| 4,563,739 | A  |   | 1/1986  | Gerpheide |
|-----------|----|---|---------|-----------|
| 6,917,694 | B1 | * | 7/2005  | Machida ................ G06V 40/12 340/5.83 |
| 6,980,672 | B2 | * | 12/2005 | Saito ........................ G07C 9/37 340/5.53 |
| 8,448,857 | B2 |   | 5/2013  | Davis |
| 9,984,355 | B2 |   | 5/2018  | Jones |
| 10,064,502| B1 |   | 9/2018  | Gyori et al. |

(Continued)

FOREIGN PATENT DOCUMENTS

| CN | 202720035 U   |   | 2/2013 |
|----|---------------|---|--------|
| JP | 2004171307 A  | * | 6/2004 |

(Continued)

OTHER PUBLICATIONS

Miao et al. "Graphene Nanostructure-Based Tactile Sensors for Electronic Skin Applications," Nano-Micro Letters, Shanghai Jiao Tong University Press, Sep. 4, 2019, 37 pages.

(Continued)

*Primary Examiner* — Dung Hong
(74) *Attorney, Agent, or Firm* — Van Leeuwen & Van Leeuwen; Anthony M. Pallone

(57) ABSTRACT

An approach is provided to authenticate objects based on surface patterns on the object. In the approach, a pressure pattern is measured between a sensor array surface of a pressure mapping sensor array accessible by the processor and one of the object's surfaces. A set of characteristics of the object surface is extracted based on the pressure pattern resulting from the measuring. These characteristics are compared to a set of expected characteristics with the object being authenticated based on the comparison.

20 Claims, 8 Drawing Sheets

(56) References Cited

U.S. PATENT DOCUMENTS

| | | | |
|---|---|---|---|
| 10,198,710 B1 | 2/2019 | Hahn | |
| 10,262,294 B1 | 4/2019 | Hahn | |
| 10,521,646 B2 | 12/2019 | Adato et al. | |
| 10,548,418 B2 | 2/2020 | Gentile et al. | |
| 2002/0044689 A1 | 4/2002 | Roustaei et al. | |
| 2009/0307097 A1* | 12/2009 | De Faria | G07G 1/0018 705/17 |
| 2010/0066697 A1* | 3/2010 | Jacomet | G06V 40/1394 345/173 |
| 2019/0005216 A1* | 1/2019 | Yakishyn | G06F 3/015 |
| 2019/0138986 A1 | 5/2019 | Puerini et al. | |
| 2019/0265792 A1 | 8/2019 | Wu | |
| 2019/0392457 A1* | 12/2019 | Kuntagod | H04L 67/12 |
| 2021/0097245 A1* | 4/2021 | Monroy-Hernández | G06K 7/10712 |

FOREIGN PATENT DOCUMENTS

| | | |
|---|---|---|
| JP | 2019145103 | 8/2019 |
| KR | 101792024 B1 * | 11/2017 |
| KR | 20180080679 A * | 7/2018 |
| WO | 2019707611 W | 4/2019 |

OTHER PUBLICATIONS

Zhang et al., "Flexible and self-powered temperature pressure dual-parameter sensors using microstructure-frame-supported organic thermoelectric materials," Nature Communications, 6:8356 | DOI: 10.1038/ncomms9356, Sep. 2015, 10 pages.

Han et al., "Ultralow-Cost, Highly Sensitive, and Flexible Pressure Sensors Based on Carbon Black and Air-laid Paper for Wearable Electronics," ACS Appl. Mater. Interfaces, Aug. 2019, 11 pages.

Kim et al., "Stretchable silicon nanoribbon electronics for skin prosthesis," Nature Communications, 5:5747, DOI: 10.1038/ncomms6747, Dec. 2014, 11 pages.

Shi et al., Self-Powered Analogue Smart Skin,: ACS Nano, Mar. 2016, pp. 4083-4091.

An et al., "Transparent and flexible fingerprint sensor array with multiplexed detection of tactile pressure and skin temperature," Nature Communications, vol. 9, Article No. 2458 (2018) (DOI:10.1038/s41467-018-04906-1), 2018, 10 pages.

"Capturing The Sense Of Touch," Pressure Profile Systems, 2020, 5 pages.

Crowder, "Tactile sensing," Sensor Products, Inc., Madison, NJ, 2015, 10 pages.

O'Neal, "Make Your Marketing Tangible with 3D Printed QR Codes," 3DPrint.com, Dec. 2014, 10 pages.

"Which technology should I choose for DataMatrix code marking?" Technifor, Gravotech Marketing, France, 2020, 4 pages.

* cited by examiner

Example of implementation of a 2D pressure sensing array and the resulting pressure heatmap that it produces Illustrative example of a relief stamp encoding a 2D identifier to be attached or embossed on the object surface in contact with the pressure sensor array

MULTI-FACTOR AUTHENTICATION AND SECURITY

BACKGROUND

Traditional authentication in modern systems involves a number of factors. These factors generally include a unique identifier, such as a user name (e.g., a user's email address, etc.), and a secondary factor, such as a password, that is used in determining whether the supplied password, or factor, matches an expected factor. Such an approach is often adequate for less-secure system settings, such as an online news portal where a maleficent user, such as a hacker, could not obtain personal and confidential information of the user if the user's account is breached. However, with more secure systems, such as online banking and other financial sites, such single-factor systems do not provide adequate security to safeguard data, such as a user's personal and confidential information. One approach to provide enhanced security is two-factor authentication where a system sends a user a code to a preassigned device corresponding to the user, such as a code sent to the user's mobile phone or email address, with the user required to enter the code within a certain amount of time. A challenge of such two-factor authentication systems is that a hacker can still breach a user's account if the hacker obtains access to second factor that is sent to the user's device, such as by hacking into a user's communication account (e.g., mobile phone, email, etc.). In this manner, the maleficent user can gain access to confidential data even from a vastly remote area, such as another country. A similar trend is expected in the tracking and monitoring of physical objects with an evolution of security systems towards the addition of more security attributes to identify assets. In order to scale up security of a system comprising physical objects, the system requires new ways of enabling precise and unique authentication through the addition of new security attributes.

BRIEF SUMMARY

An approach is provided to authenticate objects based on surface patterns on the object. In the approach, a pressure pattern is measured between a sensor array surface of a pressure mapping sensor array accessible by the processor and one of the object's surfaces. A set of characteristics of the object surface is extracted based on the pressure pattern resulting from the measuring. These characteristics are compared to a set of expected characteristics with the object being authenticated based on the comparison.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
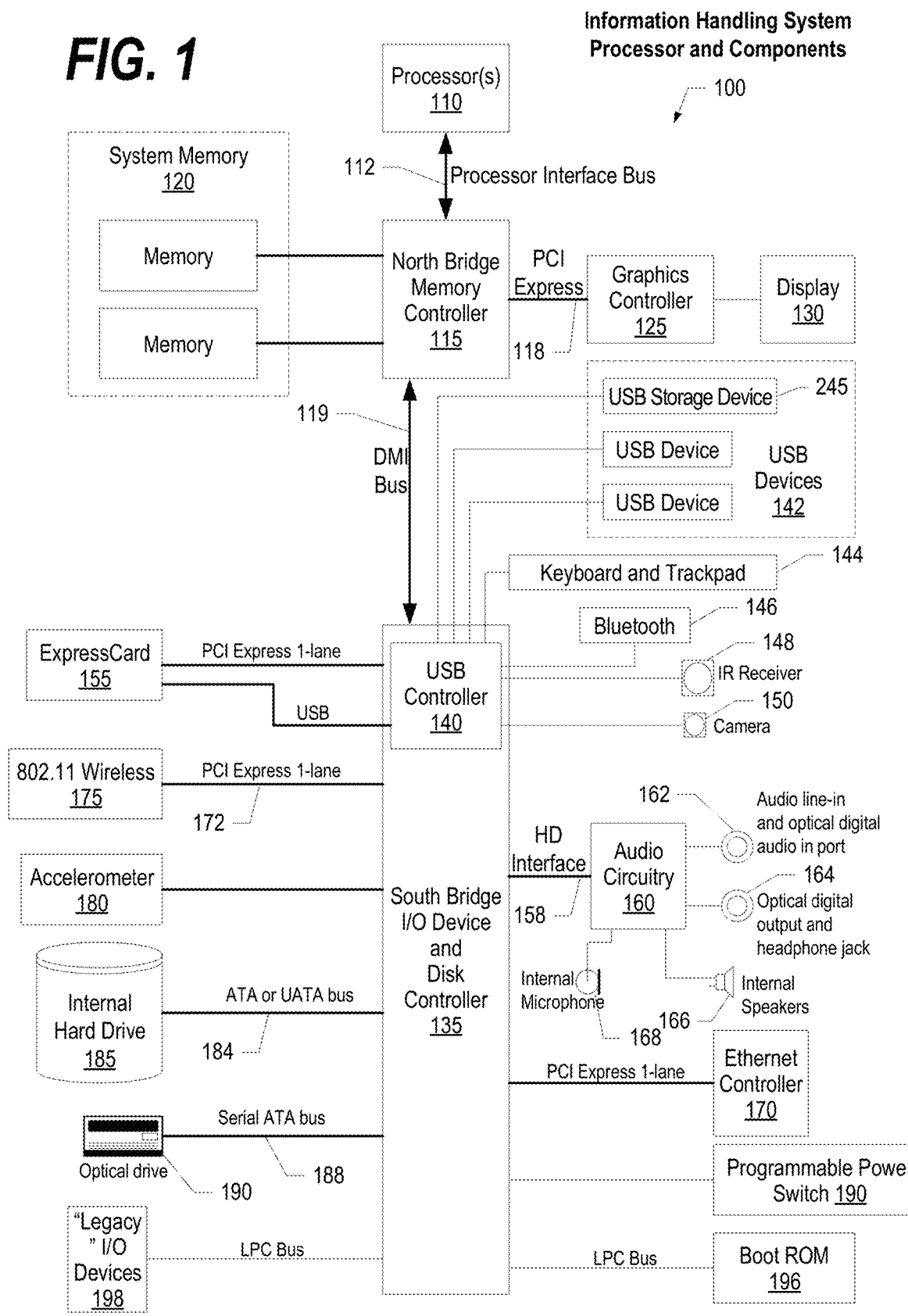
FIG. 1 is a block diagram of a data processing system in which the methods described herein can be implemented.

FIGS. 1-6 depict an approach that expands the security and surveillance of complex systems involving physical objects. The approach addresses an evolution of security systems designed toward the addition of more security attributes to identify assets. In order to scale up security of a system comprising physical objects (where objects are tracked and/or monitored), the system utilizes new ways of enabling precise and unique authentication through the addition of new security attributes.

An object of the system is authenticated by combination of at least one unique ID and at least one additional identifying factor based on measurable physical characteristics of the same object. The system utilizes a wide-area pressure mapping sensor array. In one embodiment, two-dimensional (2-D) pressure or tactile sensor films (sometimes called electronic skin or e-skin) are used to measure the pressure pattern between two surfaces, such as between a product shelf and merchandise. This 2-D pressure sensor array is capable of producing a 2-D pressure heatmap where the distribution of pressure produced by the object in contact with the sensor surface is represented as varying colors on a scale, with darker and lighter color intensity corresponding to higher and lower levels of pressure, and from which the contours of the topography of the object surface can be deduced. Various implementation and applications exist. Cost expected to decrease while resolution and sensitivity will increase in coming years. In another embodiment, a three-dimensional (3-D) sensor is utilized that can directly measure the depth (z) between high areas ("hills") and low areas ("valleys") found on the surface of the object. In this manner, two objects with similar surface patterns can produce different authentication results based on the depth of the grooves (valleys) between the contour lines as measured by both embodiments.

In one embodiment, the surface of the object is attached or imprinted with topographical identification elements (an identifier). For example, a relief stamper, that is engraved or permanently attached to the surface of the physical object can produce a contour topographical pattern (i.e. a two-dimensional matrix code (2D code) bar-code, etc.). When in contact with the pressure mapping sensor array, the relief stamper creates an identifiable pressure pattern encoding an identifier that can be used as an authentication factor.

Pattern recognition software extracts the object's static and dynamic characteristics from the pressure pattern produced by pressing the surface of the object against a pressure mapping sensor array. The uniquely identifying topographical code is extracted and read from the imprinted pressure pattern. Additional characteristics of the object that can be used in authentication include the shape and size of the pressure pattern produced by the object surface, the weight from the levels of pressure which can infer information about contents or stack height, the object position on the sensor array and the dynamics in time of the object position, and the depth of the grooves ("valleys") between the contour lines forming the pattern on the surface of the object.

The approach enables unique identification of physical objects within a digitalized system down to the identification code and can be utilized as a factor in a multi-factor authentication system. The approach also helps reduce the demand on video surveillance in systems that provide physical object security, hence speeding up adoption, reducing computing and camera demands. The disclosed approach can be used to introduce security or to enhance security level in systems intended to create digital representation of physical objects in real time. It is further applicable for designing complex IoT ("Internet-of-Things") solutions for security of tracking and monitoring of physical assets.

The system would have various components that might include a wide-area pressure sensing surface that includes a processing and communication unit. Relief elements representing a two-dimensional matrix code (2D code) affixed to or engraved on the surface of the object. Pattern recognition software, which may be part of the 'processing and communication unit' or may be located in the Cloud. The pattern recognition software includes a digital reader that transfers detected relief pattern in contours and shapes imprinted on the surface of an object. An image processing module extracts and reads the two-dimensional matrix code (2D code) from the pattern found on the surface of the object. Pressure pattern models are used to identify characteristics of the object. These characteristics include the shape, the size of the patterns, the related pressure levels of the object, position of the object, dynamics of the position of the object in time.

In a 2-D implementation, the sensor includes two layers of two-dimensional array of parallel electrodes placed orthogonally to each other and separated by a dielectric. Each electrode row and column connected to a control unit that interprets the changes in capacitance and produces a 2D array (matrix) of pressure level. This 2-D pressure matrix or heatmap represents the distribution of pressure produced by the object in contact with the sensor surface at closely spaced measuring spots. The darker and lighter color intensities on this heatmap correspond to higher and lower levels of pressure from which the contours of the topography of the object surface can be extracted using pattern recognition software. Further implementation of a 3-D surface reader can directly read the depth (z) between the contour lines found on the surface of the object, is shown in FIG. 3 and further referenced in other Figures.

In one embodiment, monitoring of the pressure mapping sensor array is activated. Objects are imprinted (e.g., stamped, etched, attached etc.) with topographical relief elements, which encodes a unique identifier of the object in the form of one of a one-dimensional barcode, a two-dimensional barcode, a two-dimensional matrix code, a QR-code or other type of code containing data. In one embodiment, these elements include various depths between contour lines. Objects are assigned identifiers based on the two-dimensional matrix code (2D code) represented on the attached relief stamper. In one embodiment, the identifier is imprinted on the object surface. The system captures and processes the pressure pattern resulting from pressing the surface with the attached relief stamper of the object against the sensor array to identify objects and their current location. Other characteristics (e.g., weight, orientation, depth of groves, heights of contour lines, etc.) are also ascertained from the sensor array.

The approach scans a wide area sensing surface and captures the resulting pressure pattern. A digital reader is used to convert the pressure pattern into contours of shapes (segmentation). The approach identifies distinct contours and separates by object, extract location and size information. Pattern recognition is applied to identify the object type based on a unique identifier of the object in the form of one of a one-dimensional barcode, a two-dimensional barcode, a two-dimensional matrix code, a QR-code, a three-dimensional code, an alpha-numerical code, a symbol or any other type character used as identifier, to identify the object's weight and, code (2D code) to identify at least one of the object surface shapes. The gathered information is transmitted to a security platform for authentication (e.g., determining whether retrieved BOTH unique identifier AND surface characteristics match expected surface characteristics, etc.). The above steps can be repeated continuously in order to perform ongoing security monitoring.

A few of the many possible use cases are presented in the examples below. First, in smart buildings, personnel security can be provided by having a topographical code imprinted on the sole of the user's shoes that can further identify individuals based on characteristics (e.g., imprinted code, weight, stride distance, etc.) that can be compared to the user's expected characteristics to determine if an imposter is using the user's building access credentials (e.g., badge presented to card reader, etc.). In a retail management example, the approach can be used with shelf surfaces that have sensor arrays that detect and identify objects placed on and removed from shelves. Other characteristics such as weight and pressure intensity can also be used as identification characteristics. Retail shelf systems can be used in combination with video surveillance systems with the advantage of being able to uniquely identify items selected by customers while reducing the demand on the camera system and visual models.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
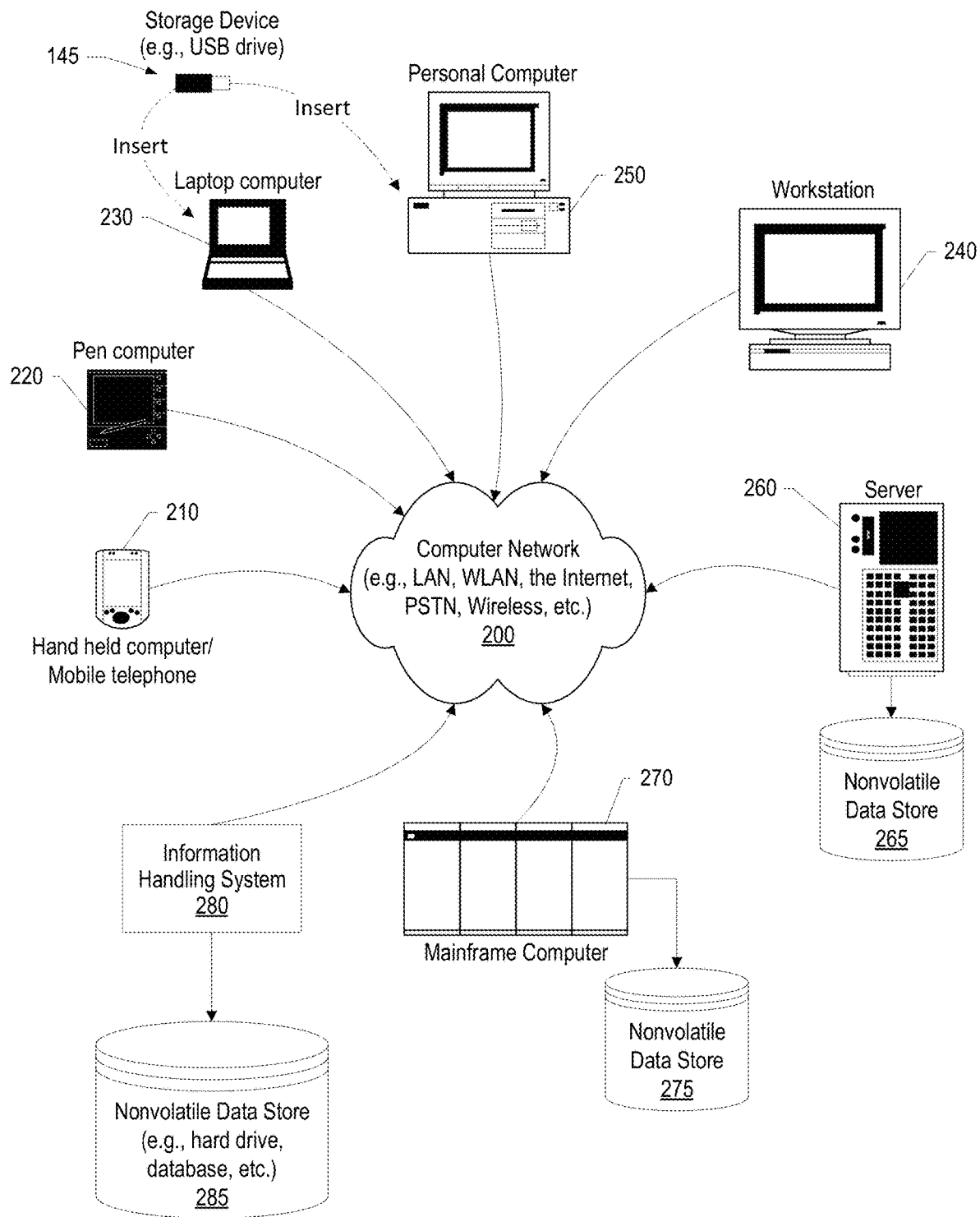
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory.

Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3A:
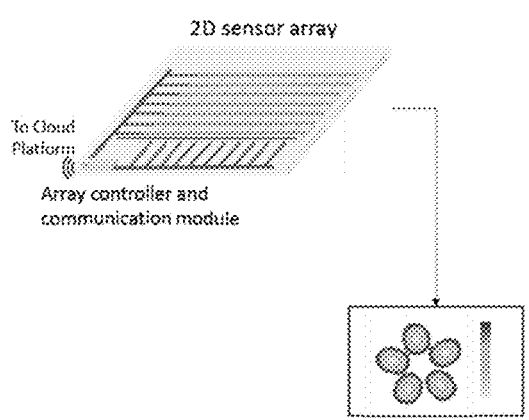
FIG. 3A depicts an implementation example of a 2D pressure sensing array and the pressure heatmap that it produces.
Figure 3A:
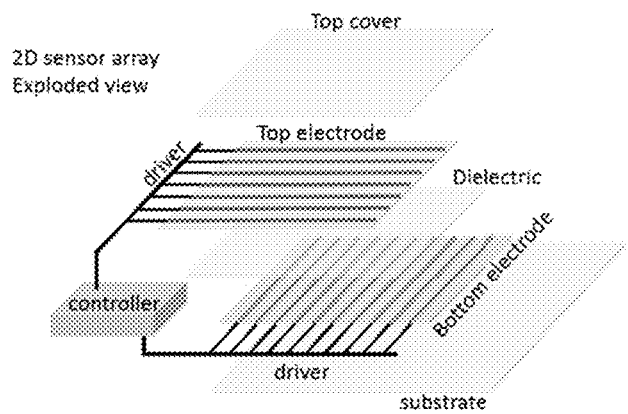

FIG. 3A depicts an implementation example of a 2D pressure sensing array and the pressure heatmap that it produces; In this 2-D implementation the sensor includes two layers of two-dimensional array of parallel electrodes placed orthogonally to each other and separated by a dielectric. Each electrode row and column connected to a control unit that interprets the changes in capacitance and produces a 2-D array (matrix) of pressure level. This 2-D pressure matrix or heatmap represents the distribution of pressure produced by the object in contact with the sensor surface at closely spaced measuring spots. The darker and lighter color intensities on this heatmap correspond to higher and lower levels of pressure from which the contours of the topography of the object surface can be extracted using pattern recognition software. FIG. 3 (b) is an illustrative example of a relief stamper encoding a 2D identifier to be attached or embossed on the object surface in contact with the pressure sensor array.

Figure 3B:
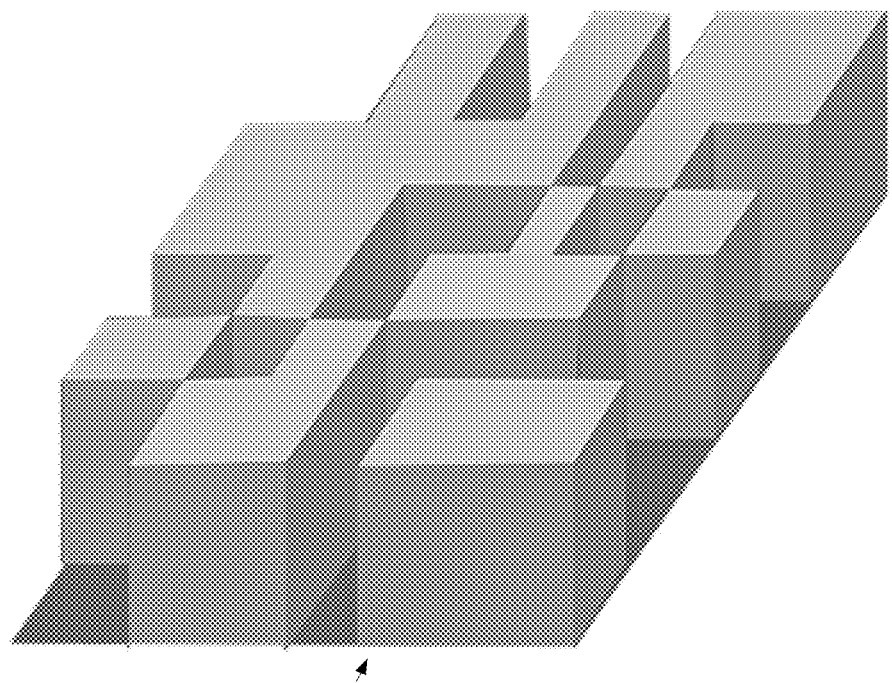
FIG. 3B is an illustrative example of a relief stamper encoding a 2D identifier to be attached or embossed on the object surface in contact with the pressure sensor array.

FIG. 3B is an illustrative example of a relief stamper encoding a 2D identifier to be attached or embossed on the object surface in contact with the pressure sensor array.

Figure 3C:
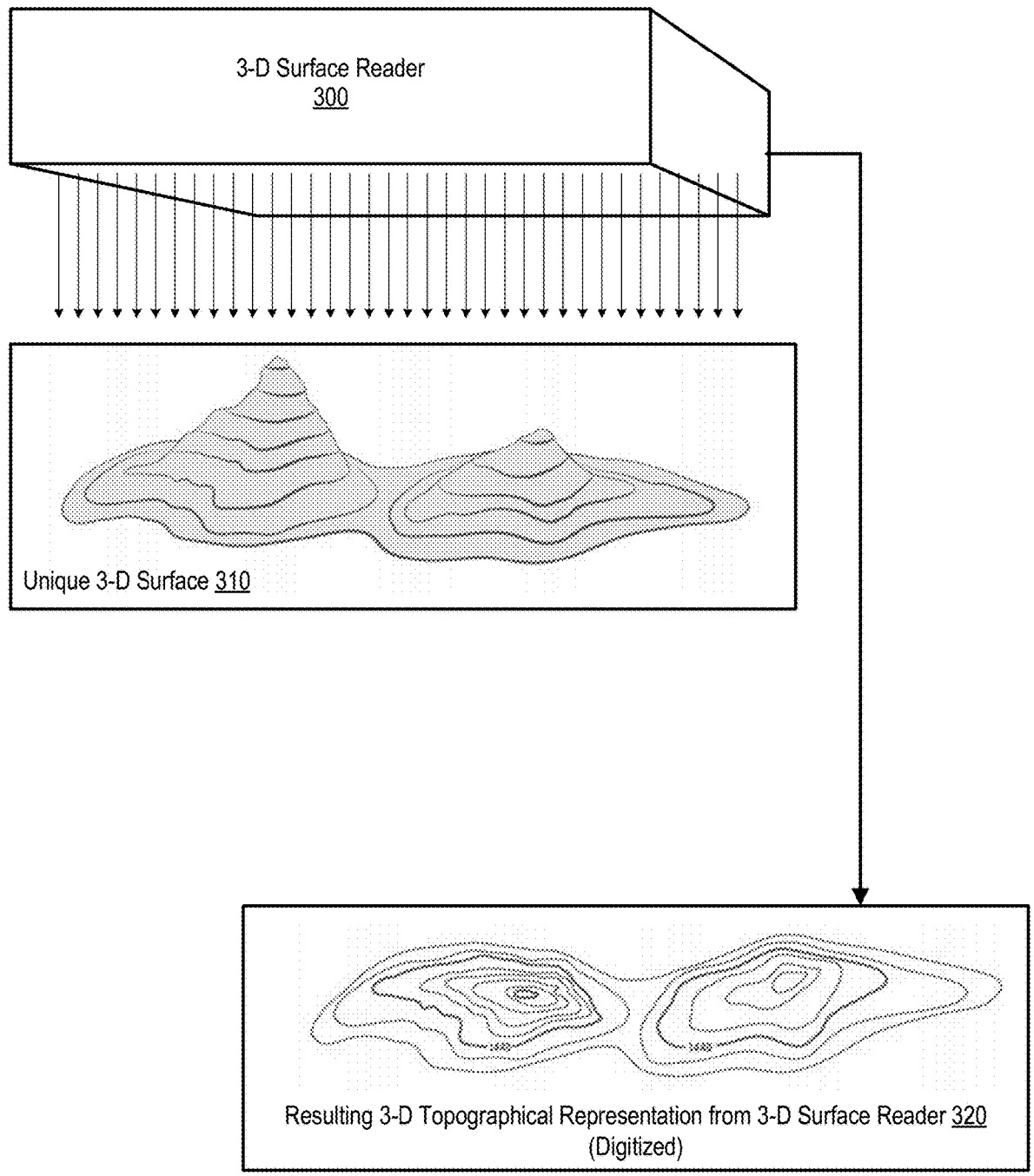
FIG. 3C is a component diagram depicting a pressure-mapping array surface reader analyzing a unique 3-D surface and resulting with a 2-D topographical representation.

FIG. 3C is a component diagram depicting a 3-D surface reader implementation analyzing a unique 3-D surface and resulting with a 3-D topographical representation. Three-dimensional (3-D) surface reader 300 directly analyzes a surface of object 310 and provides data regarding both the contour lines found on the surface of the object but also the depth of the valleys with respect to the hills that form the contours of the surface of the object. In one embodiment, surface reader employs a series of lasers that identify the distance (z) of the various depths found on the surface of the object. In a mechanical system, an array of depressible pins is arranged on the surface of the reader so that when pressed against the surface of the object the various pins are retracted a distance based on the depth of the contour of the object surface found directly underneath the respective pins. Using either a laser or depressible pin approach results in resulting 3-D topography representation 320 that indicate the various contour lines of the surface of the object as well as the height of the various high points on the surface ("hills") and the depths of the various low points ("valleys") with respect to such hills.

Figure 4:
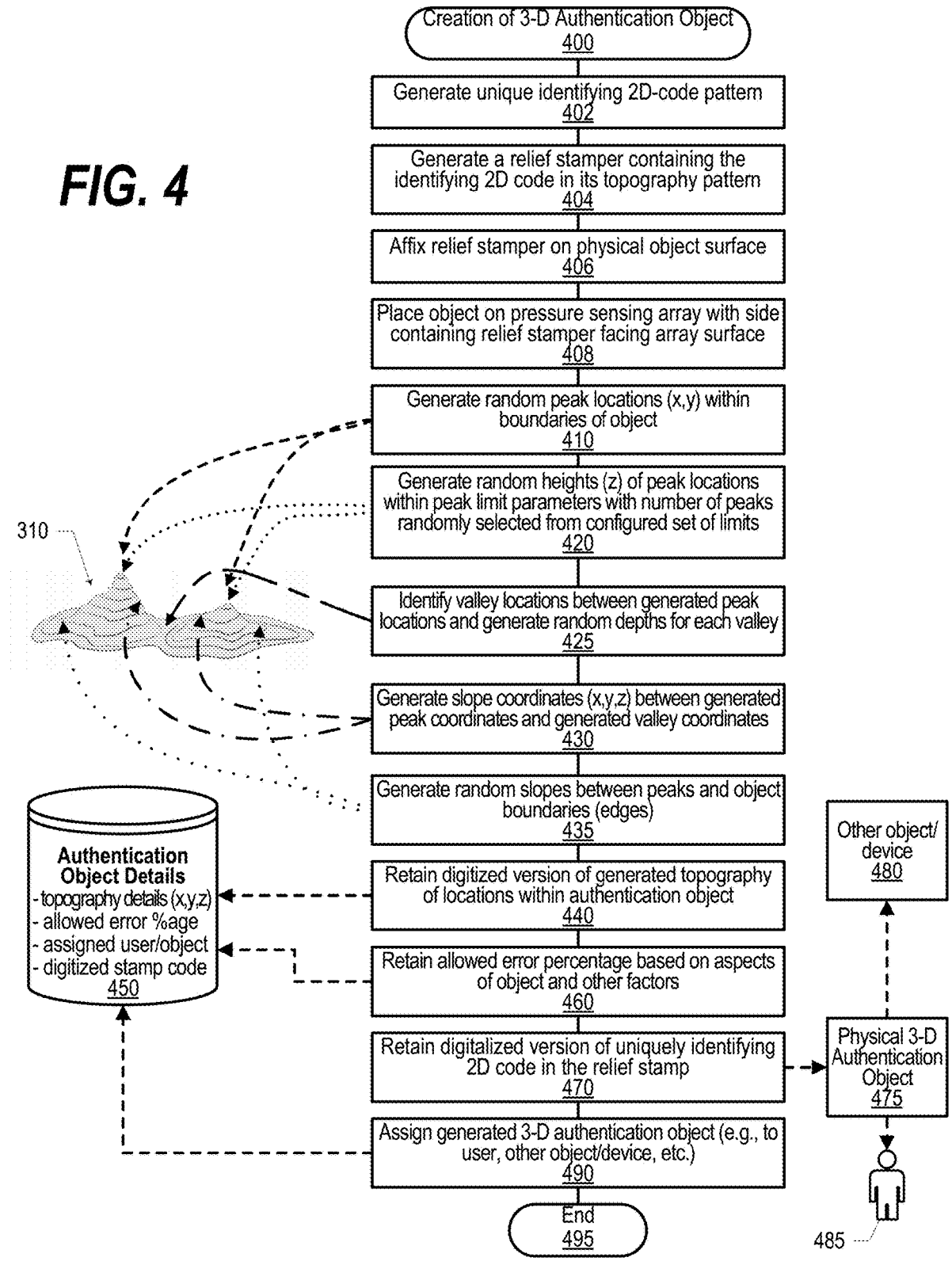
FIG. 4 is a flowchart showing steps used to create a 2-D authentication object.

FIG. 4 is a flowchart showing steps used to first create a 3-D authentication object. FIG. 4 processing commences at 400 and shows the steps taken by a process that creates a physical authentication object. In this embodiment, a uniquely identifying 2D-code pattern is generated in step 402. In 404, a relief stamper is generated containing the identifying 2D-code in its topography pattern, which is then affixed or engraved on the surface of a three-dimensional object in step 406. In step 408, the resulting unique surface topography is presented to a surface reader to provide authentication data (e.g., one factor in a multi-factor authentication scheme, etc.), with the identifying relief stamper facing the sensor used to authenticate the object or a user that is in possession of the object (e.g., a unique physical token assigned to a user, etc.).

At step 410, the process generates a set of random peak locations (x,y) within the prescribed boundaries of the object being created 310. At step 420, the process generates a set of random heights (z) of the peak locations within a set of peak limit parameters with the number of peaks being randomly selected from a configured set of limits.

At step 425, the process identifies the valley locations (x,y) between the generated peak locations and then generates random depths (z) for each valley with the depths being within a set of valley depth limit parameters. At step 430, the process generates the slope coordinates (x,y,z) between the generated peak coordinates and the generated valley coordinates given the heights of the peaks and the depths of the valleys. At step 435, the process generates a set of random slopes between the generated peaks and the object boundaries forming the edges of the object surface. At step 440, the process retains a digitized version of the generated topography (x,y,z) of the locations within the surface of the authentication object. The data forming the digitized version is stored in data store 450.

At step 460, the process retains an allowed error percentage based on aspects of object, such as material used to form object—plastic, metal, cardboard, etc., and other environmental and security factors. This allows an authentication object to be successfully authenticated when the object has been slightly worn given the materials used and the environmental conditions. This error percentage data is also stored in data store 450 along with other data describing the authentication object.

At step 470, the process retains the digitalized version of the uniquely identifying 2D-code in the relief stamper pattern and stored in data store 450. The process then generates physical authentication object entry 475 in a database uniquely associating the ID with the object and a user of the object if relevant. At step 490, the process assigns the generated authentication object, such as to user 485, to another object or device 480, etc. The authentication object creation process shown in FIG. 4 thereafter ends at 495.

Figure 5:
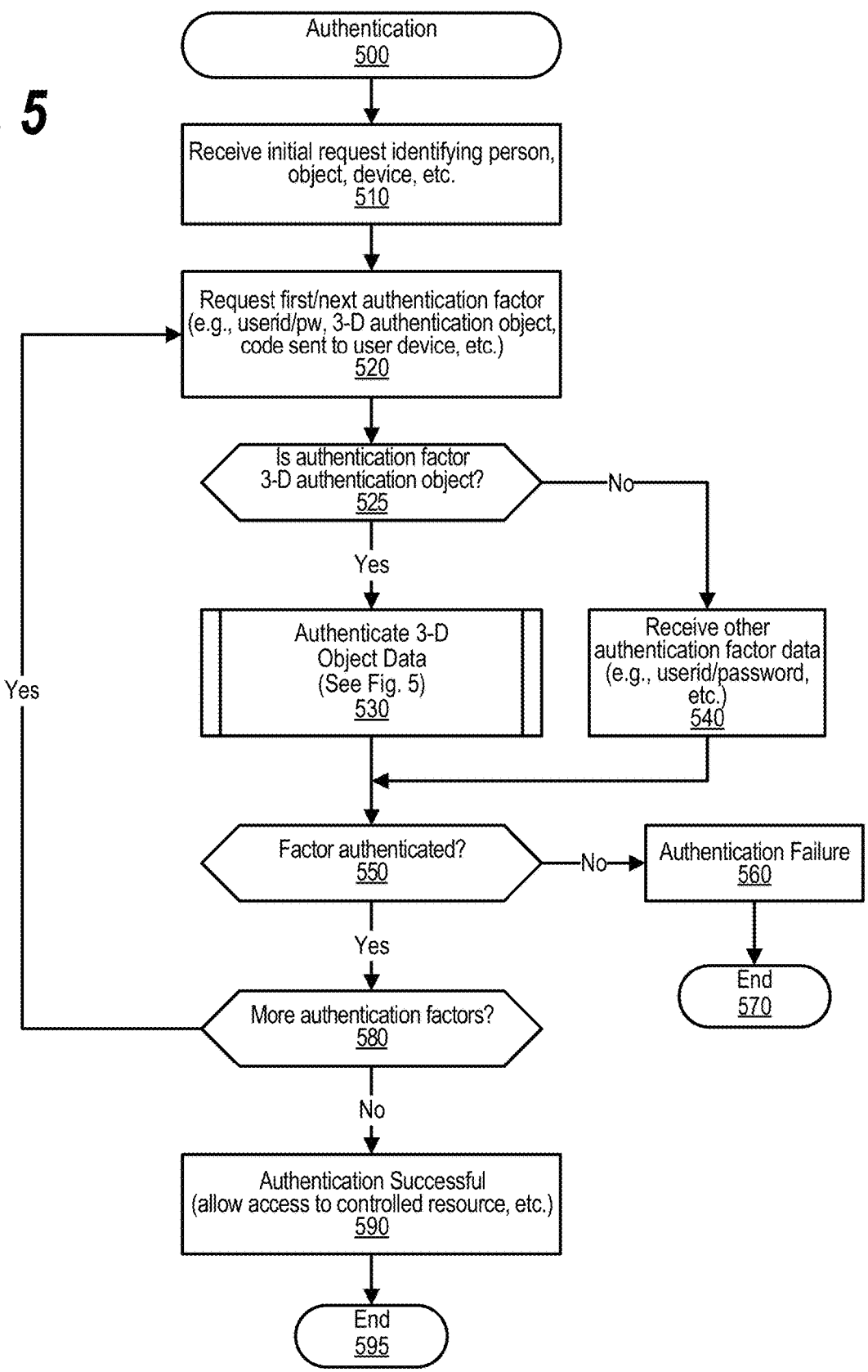
FIG. 5 is a flowchart showing steps used to authenticate a physical object using a pressure-mapping array surface reader.

FIG. 5 is a flowchart showing steps used to authenticate a physical object using a surface reader. FIG. 5 processing commences at 500 and shows the steps taken by a process that performs an authentication process that includes two or more factors. At step 510, the process receives an initial request identifying a person, object, device, etc. For example, a person might be identified with a received user identifier (e.g., email address, etc.) while an object or device might be identified based on an identifier assigned to the object or device with such identifier being optionally encoded onto a surface of the object or device depending on the application environment.

At step 520, the process requests the first authentication factor. The authentication factor can be a password, an authentication object, a code transmitted to a user device, or the like. The process determines as to whether the authentication factor is an authentication object (decision 525). If the authentication factor is an authentication object, then decision 525 branches to the 'yes' branch to perform predefined process 530. At predefined process 530, the process performs the Authenticate Object Data routine (see FIG. 6 and corresponding text for processing details). On the other hand, if the authentication factor is not an authentication object, then decision 525 branches to the 'no' branch to perform step 540. At step 540, the process receives some other form of authentication factor data (e.g., userid/password, etc.).

The process determines as to whether the received authentication factor is successfully authenticated (decision 550). If the received authentication factor is successfully authenticated, then decision 550 branches to the 'yes' branch for further processing of perhaps more authentication factors. On the other hand, if the received authentication factor is not successfully authenticated, then decision 550 branches to the 'no' branch whereupon, at step 560, an authentication failure occurs and processing ends at 570.

If the authentication factor was successfully authenticated, then decision 550 branches to the 'yes' branch whereupon the process determines whether there are more authentication factors to process (decision 580). If there are more authentication factors to process, then decision 580 branches to the 'yes' branch which loops back to step 520 to receive and process the next authentication factor as described above. This looping continues until all of the authentication factors are successfully authenticated, at which point decision 580 branches to the 'no' branch exiting the loop. At step 590, the process authenticates the user/object/device as all of the authentication factors have been successfully authenticated. The system can now allow access to a controlled resource based on the design of the system. FIG. 5 processing thereafter ends at 595.

Figure 6:
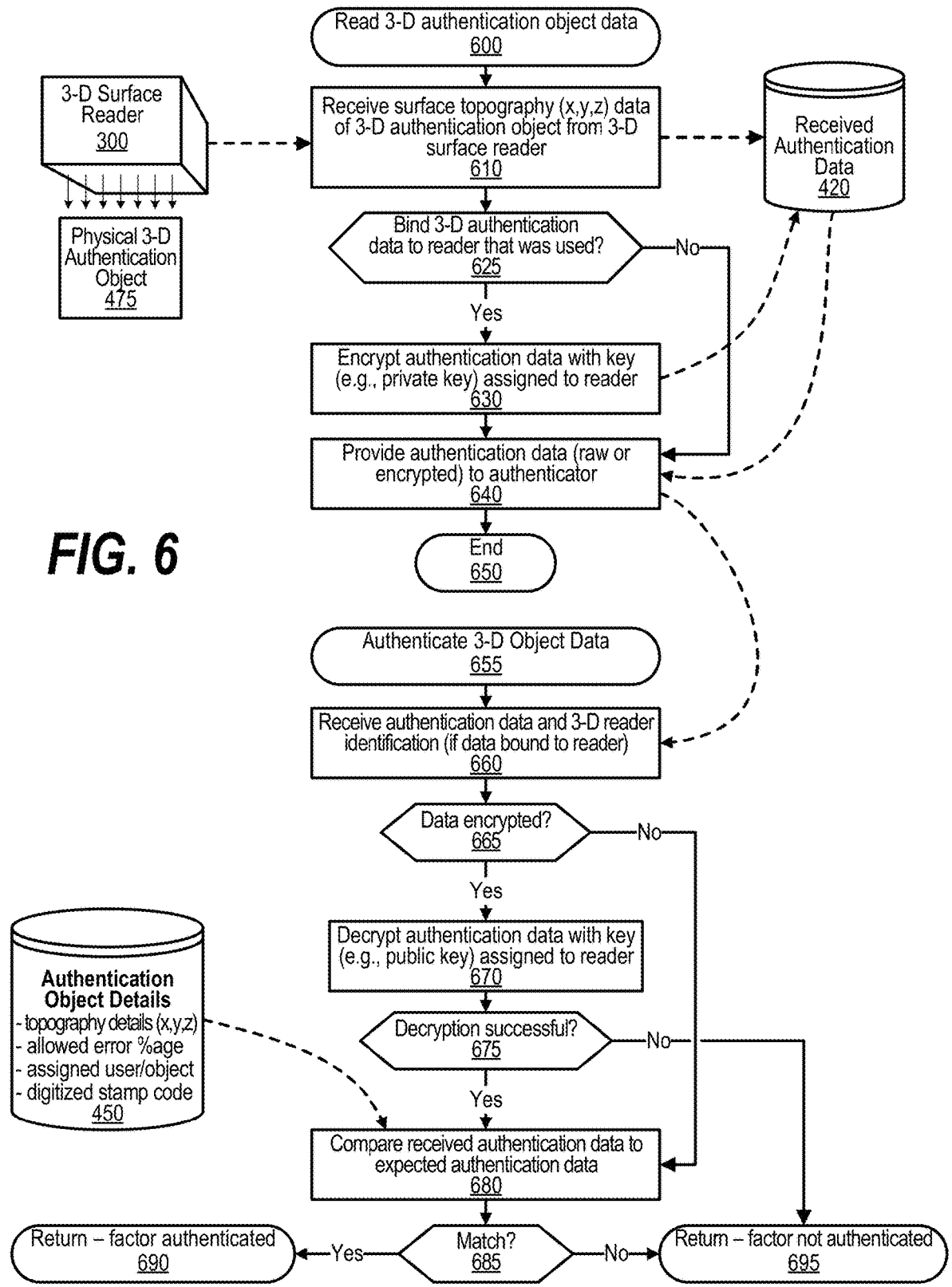
FIG. 6 is a flowchart showing steps used to process a 2-D object to authenticate a resulting authentication factor.

FIG. 6 is a set of two flowcharts showing steps used to process an object to authenticate a resulting authentication factor. The top flowchart, commencing at 600, depicts steps used to read the authentication object data. The bottom flowchart, commencing at 655, depicts steps used to authenticate the object using the authentication object data read by the top flowchart.

Processing of the top flowchart commences at 600 and shows the steps taken by a process that reads the authentication object data by analyzing an object surface. At step 610, the process receives surface topography (x,y,z) data of the object surface from surface reader 300 that is applied to physical object surface 475 so that an array of sensors on a surface of the reader is pressed against a surface of the object that is encoded with authentication contour data including the topography contours of a relief stamper containing a uniquely identifying-code affixed to the object's surface. The received data is stored in data store 420 with the received data including coordinate data and, in one embodiment, depth information corresponding to the various coordinates of the surface of the object.

The process determines as to whether to cryptographically bind the authentication data to the surface reader that was used to analyze the object surface (decision 625). If binding is being performed, then decision 625 branches to the 'yes' branch whereupon at step 630 the process encrypts the received authentication data with a key (e.g., private key) assigned to the surface reader. On the other hand, if binding is not being performed, then decision 625 branches to the 'no' branch bypassing step 630. At step 640, the process provides authentication data (raw or encrypted) to the authenticator process and top flowchart processing ends at 650.

Bottom flowchart processing commences at 655 and shows the steps taken by a process that authenticates object data read by a surface reader. At step 660, the process receives the authentication data and the surface reader identification (if data bound to reader). The process determines as to whether data encrypted and bound to the reader (decision 665). If the data is encrypted and bound to the reader, then decision 665 branches to the 'yes' branch to perform steps 670 and 675. On the other hand, if the data is not encrypted/bound, then decision 665 branches to the 'no' branch bypassing steps 670 and 675.

Steps 670 and 675 are performed to unbind the data from the surface reader. At step 670, the process decrypts the authentication data with a key (e.g., public key, etc.) assigned to the surface reader that was used to read the object surface. The process determines as to whether the decryption is successful (decision 675). If decryption is successful, then decision 675 branches to the 'yes' branch for further processing. On the other hand, if the decryption was unsuccessful, then decision 675 branches to the 'no' branch whereupon processing returns to the calling routine (see FIG. 5) with an error code indicating that the factor was not authenticated.

At step 680, the process compares the received authentication data from the object surface to the expected authentication data retrieved from data store 450. The process determines as to whether the authentication data matches the expected authentication data (decision 685). If successfully matched, then decision 685 branches to the 'yes' branch whereupon processing returns to the calling routine at 690 (see FIG. 5) with a return code indicating that the factor was successfully authenticated. On the other hand, if the object surface data does not match the expected data, then decision 685 branches to the 'no' branch whereupon processing returns to the calling routine at 695 (see FIG. 5) with an error code indicating that the factor was not authenticated.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    measuring a pressure pattern between a sensor array surface of a pressure mapping sensor array accessible by the processor and an identifier affixed to a surface of an object, wherein the identifier includes one or more impressions, and wherein the measured pressure pattern is based on a weight of the object and the identifier;
    extracting a plurality of characteristics of the object based on the pressure pattern resulting from the measuring;
    comparing the plurality of characteristics with a set of expected characteristics; and
    authenticating the object based on the comparison.

2. The method of claim 1 wherein the impressions included in the identifier are impressed at a plurality of depth (z) measurements between one or more high points (hills) and one or more low points (valleys) found on affixed identifier.

3. The method of claim 1 wherein at least one of the characteristics of the object include at least one of the characteristics from a group consisting of a dimension of the object, a shape of the object, a position of the object on the sensor array surface, and the weight of the object.

4. The method of claim 1 wherein the authenticating further comprising:
    gathering the set of expected characteristics, the gathering including:
        measuring the pressure pattern between the sensor array surface and the object surface; and
        extracting a plurality of characteristics of the object surface based on the pressure pattern resulting from the measuring; and
    affixing the identifier to the surface of the object;
    assigning the identifier to the object; and
    storing the assigned identifier and the plurality of characteristics as the set of expected characteristics of the object in a data store.

5. The method of claim 4, wherein the affixing is performed by a relief stamper and wherein the method further comprises:
  generating a unique design corresponding to the object wherein the unique design is included in the identifier and includes the one or more impressions.

6. The method of claim 1 further comprising:
  after the authentication in which the authentication is successful:
    identifying one or more minor differences between the identifier and the set of expected characteristics; and
    updating the set of expected characteristics, wherein the updating eliminates the one or more minor differences.

7. The method of claim 1 further comprising:
  receiving the identifier of the object and at least one physical property of the object;
  retrieving the set of expected characteristics based on the received identifier;
  granting access to a controlled resource in response to the authentication being successful; and
  denying access to the controlled resource in response to the authentication being unsuccessful.

8. An information handling system comprising:
  one or more processors;
  one or more data stores accessible by at least one of the processors;
  a memory coupled to at least one of the processors; and
  a set of computer program instructions stored in the memory and executed by at least one of the processors that perform actions comprising:
    measuring a pressure pattern between a sensor array surface of a pressure mapping sensor array accessible by the processor and an identifier affixed to a surface of an object, wherein the identifier includes one or more impressions, and wherein the measured pressure pattern is based on a weight of the object and the identifier;
    extracting a plurality of characteristics of the object based on the pressure pattern resulting from the measuring;
    comparing the plurality of characteristics with a set of expected characteristics; and
    authenticating the object based on the comparison.

9. The information handling system of claim 8 wherein the impressions included in the identifier are impressed at a plurality of depth (z) measurements between one or more high points (hills) and one or more low points (valleys) found on affixed identifier.

10. The information handling system of claim 8 wherein at least one of the characteristics of the object include at least one of the characteristics from a group consisting of a dimension of the object, a shape of the object, a position of the object on the sensor array surface, and the weight of the object.

11. The information handling system of claim 8 wherein the authenticating wherein the actions further comprise:
  gathering the set of expected characteristics, the gathering including:
    measuring the pressure pattern between the sensor array surface and the object surface; and
    extracting a plurality of characteristics of the object surface based on the pressure pattern resulting from the measuring; and
  affixing the identifier to the surface of the object;
  assigning the identifier to the object; and
  storing the assigned identifier and the plurality of characteristics as the set of expected characteristics of the object in a data store.

12. The information handling system of claim 11, wherein the affixing is performed by a relief stamper and wherein the actions further comprise:
  generating a unique design corresponding to the object wherein the unique design is included in the identifier and includes the one or more impressions.

13. The information handling system of claim 8 wherein the actions further comprise:
  after the authentication in which the authentication is successful:
    identifying one or more minor differences between the identifier and the set of expected characteristics; and
    updating the set of expected characteristics, wherein the updating eliminates the one or more minor differences.

14. The information handling system of claim 8 wherein the actions further comprise:
  receiving the identifier of the object and at least one physical property of the object;
  retrieving the set of expected characteristics based on the received identifier;
  granting access to a controlled resource in response to the authentication being successful; and
  denying access to the controlled resource in response to the authentication being unsuccessful.

15. A non-transitory computer readable medium configured to store a computer program product comprising computer program code that, when executed by an information handling system, causes the information handling system to perform actions comprising:
  measuring a pressure pattern between a sensor array surface of a pressure mapping sensor array accessible by the processor and an identifier affixed to a surface of an object, wherein the identifier includes one or more impressions, and wherein the measured pressure pattern is based on a weight of the object and the identifier;
  extracting a plurality of characteristics of the object based on the pressure pattern resulting from the measuring;
  comparing the plurality of characteristics with a set of expected characteristics; and
  authenticating the object based on the comparison.

16. The non-transitory computer readable medium of claim 15 wherein the impressions included in the identifier are impressed at a plurality of depth (z) measurements between one or more high points (hills) and one or more low points (valleys) found on affixed identifier.

17. The non-transitory computer readable medium of claim 15 wherein at least one of the characteristics of the object include at least one of the characteristics from a group consisting of a dimension of the object, a shape of the object, a position of the object on the sensor array surface, and the weight of the object.

18. The non-transitory computer readable medium of claim 15 wherein the actions further comprise:
  gathering the set of expected characteristics, the gathering including:
    measuring the pressure pattern between the sensor array surface and the object surface; and
    extracting a plurality of characteristics of the object surface based on the pressure pattern resulting from the measuring; and
  generating a unique design corresponding to the object wherein the unique design is included in the identifier and includes the one or more impressions;
  affixing the identifier to the surface of the object with a relief stamper;
  assigning the identifier to the object; and
  storing the assigned identifier and the plurality of characteristics as the set of expected characteristics of the object in a data store.

19. The non-transitory computer readable medium of claim 15 wherein the actions further comprise: after the authentication in which the authentication is successful: identifying one or more minor differences between the identifier and the set of expected characteristics; and updating the set of expected characteristics, wherein the updating eliminates the one or more minor differences.

20. The non-transitory computer readable medium of claim 15 wherein the actions further comprise: receiving the identifier of the object and at least one physical property of the object; retrieving the set of expected characteristics based on the received identifier; granting access to a controlled resource in response to the authentication being successful; and denying access to the controlled resource in response to the authentication being unsuccessful.

* * * * *